(12) United States Patent
Cariou et al.

(10) Patent No.: US 12,342,359 B2
(45) Date of Patent: Jun. 24, 2025

(54) DYNAMICALLY ENABLING AND DISABLING EXTREMELY HIGH THROUGHPUT (EHT) FOR MULTI-LINK

(71) Applicant: Intel Corporation, Santa Clara, CA (US)

(72) Inventors: Laurent Cariou, Milizac (FR); Thomas J. Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 622 days.

(21) Appl. No.: 17/454,861

(22) Filed: Nov. 15, 2021

(65) Prior Publication Data

US 2022/0078785 A1    Mar. 10, 2022

(51) Int. Cl.
*H04W 72/51*    (2023.01)

(52) U.S. Cl.
CPC .................................. *H04W 72/51* (2023.01)

(58) Field of Classification Search
CPC ...................................................... H04W 72/51
USPC ........................................................ 370/329
See application file for complete search history.

(56) References Cited

U.S. PATENT DOCUMENTS

2019/0364555 A1    11/2019  Huang et al.
2021/0076413 A1     3/2021  Lu et al.

FOREIGN PATENT DOCUMENTS

| EP | 3793313 A1 | 3/2021 |
| WO | 2021-003700 A1 | 1/2021 |
| WO | 2021-085995 A1 | 5/2021 |

OTHER PUBLICATIONS

International Search Report and Written Opinion issued Feb. 3, 2023 in Application No. PCT/USUS2022/046810, 12 pgs.
International Preliminary Report on Patentability mailed May 30, 2024 in Application No. PCT/US2022/046810, 8 pages.

*Primary Examiner* — Angel T Brockman
(74) *Attorney, Agent, or Firm* — Eversheds Sutherland (US) LLP

(57) ABSTRACT

This disclosure describes systems, methods, and devices related to extremely high throughput (EHT) capabilities. A device may detect a first station device (STA), wherein the first STA operates as a legacy device. The device may detect a second STA, wherein the second STA operates as an EHT device. The device may exchange first capabilities with the first STA, wherein the first capabilities include support for legacy features. The device may exchange second capabilities with the second STA, wherein the second capabilities include multi-link operation (MLO) support. The device may dynamically de-correlate EHT capabilities from the second STA. The device may establish a communication channel with the second STA based on an energy detection (ED) threshold that is determined based on the de-correlation of the EHT capabilities.

20 Claims, 9 Drawing Sheets

DYNAMICALLY ENABLING AND DISABLING EXTREMELY HIGH THROUGHPUT (EHT) FOR MULTI-LINK

TECHNICAL FIELD

This disclosure generally relates to systems and methods for wireless communications and, more particularly, to dynamically enabling/disabling extremely high throughput (EHT) for multi-link devices.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
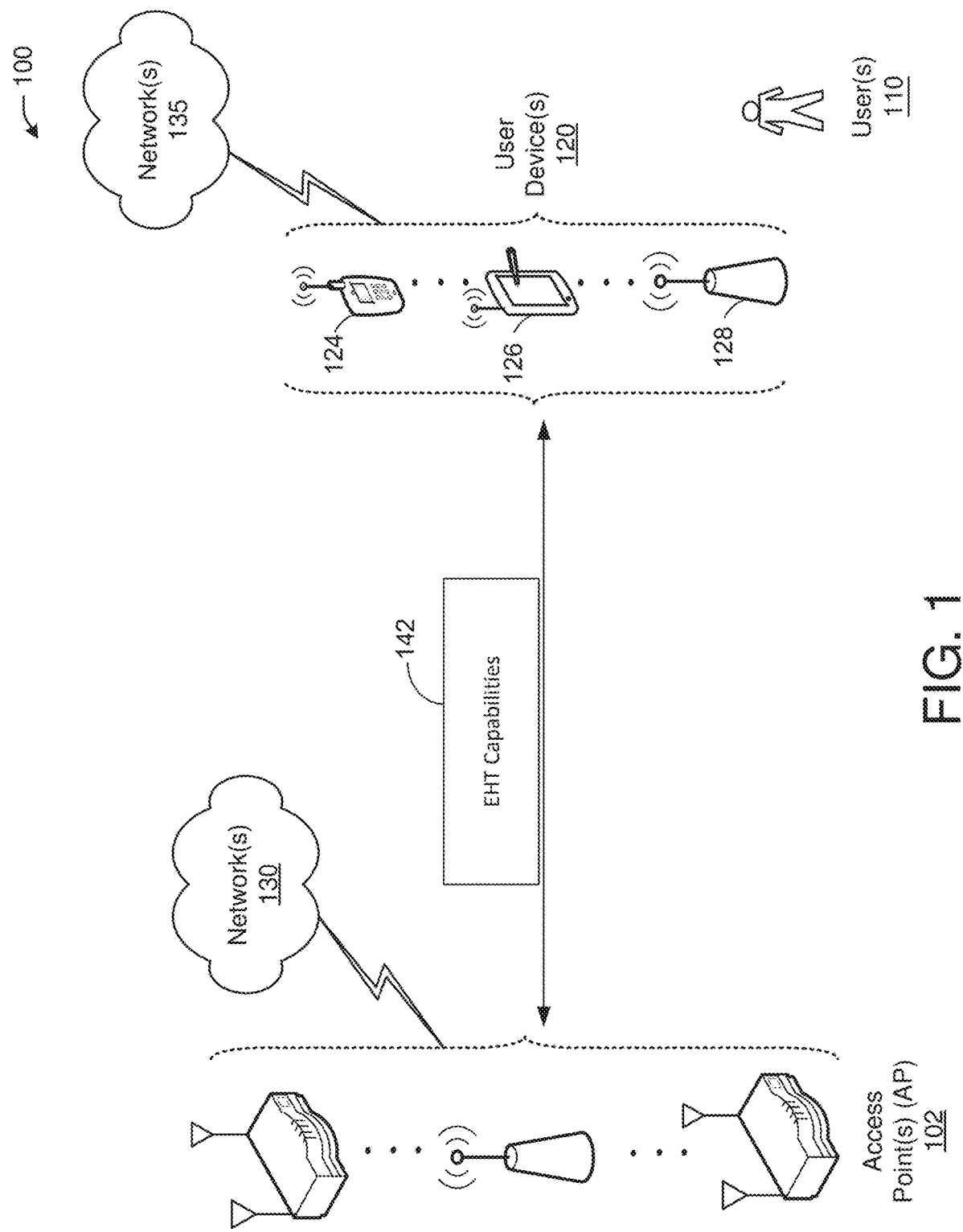
FIG. 1 is a network diagram illustrating an example network environment for extremely high throughput (EHT) capabilities, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

European Telecommunications Standards Institute (ETSI) Broadband Radio Access Networks (BRAN) has recently adopted 2 documents that regulate unlicensed operation at 5 and 6 GHz. It is the result of a compromise between companies that are more Wi-Fi-centric, which were looking to preserve the energy detection (ED) levels that have been used successfully over the last 20 years, and companies that are more cellular-centric, which were looking for the same ED levels for all devices, regardless of other technology-specific protection. This includes the Packet detection used in Wi-Fi where the preamble is used to detect if a signal is a Wi-Fi signal.

Example embodiments of the present disclosure relate to systems, methods, and devices for dynamically enabling/disabling EHT for multi-link devices (MLDs).

In one or more embodiments, an EHT capabilities system may facilitate to fully decorrelate multi-link operation of an EHT device from EHT operation, which is a mode of operation for a particular STA. Multi-link operation is a functionality of a multi-link device that has multiple STAs, each operating on a different frequency band and link. An EHT device may be any device that operates in accordance with IEEE 802.11be ("11be") standard or any next generation standard.

In one or more embodiments, an EHT capabilities system may facilitate enabling an EHT AP to dynamically enable and disable EHT operation on its BSS, by advertising this change to its associated STAs in a broadcast and/or unicast manner.

In one or more embodiments, an EHT capabilities system may facilitate to dynamically change the ED threshold that the AP and associated STAs will use if EHT is enabled or disabled, so that it is compliant with the ED threshold defined for EHT if EHT support is enabled, and compliant with the ED threshold defined for legacy/IEEE 802.11ax ("11ax") if EHT support is disabled. Devices that operate in accordance with the 11ax standard may be referred to as high efficiency (HE) devices.

In one or more embodiments, an EHT capabilities system may facilitate that as a multi-link operation is decorrelated from the different STAs support for EHT operation, within a Multi-link device operating on 2.4, 5, and 6 GHz for instance, the STA/AP operating at 5 GHz can enable/disable EHT operation, while not changing anything to Multi-link operation of the MLD to which the STA/AP is affiliated with.

In one or more embodiments, an AP could also enforce a maximum transmit power for its associated STAs, so that all these STAs would operate in the region where the ED threshold is equal to −62 dBm or as close as possible from −62 dBm. This threshold is currently 13 dBm. That makes this possibly applicable in very dense environments.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of EHT capabilities, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 4:
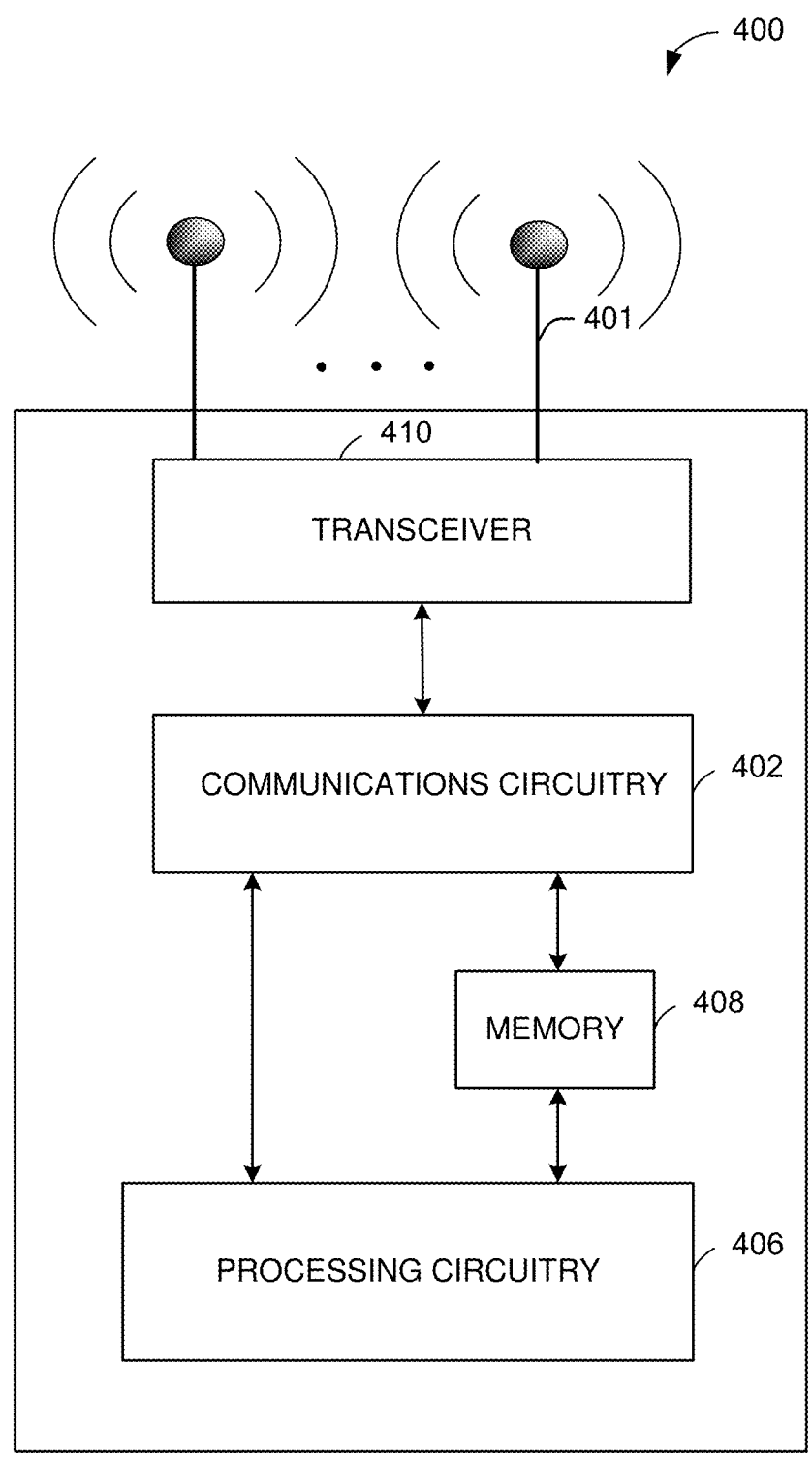
FIG. 4 illustrates a functional diagram of an exemplary communication station that may be suitable for use as a user device, in accordance with one or more example embodiments of the present disclosure.
Figure 5:
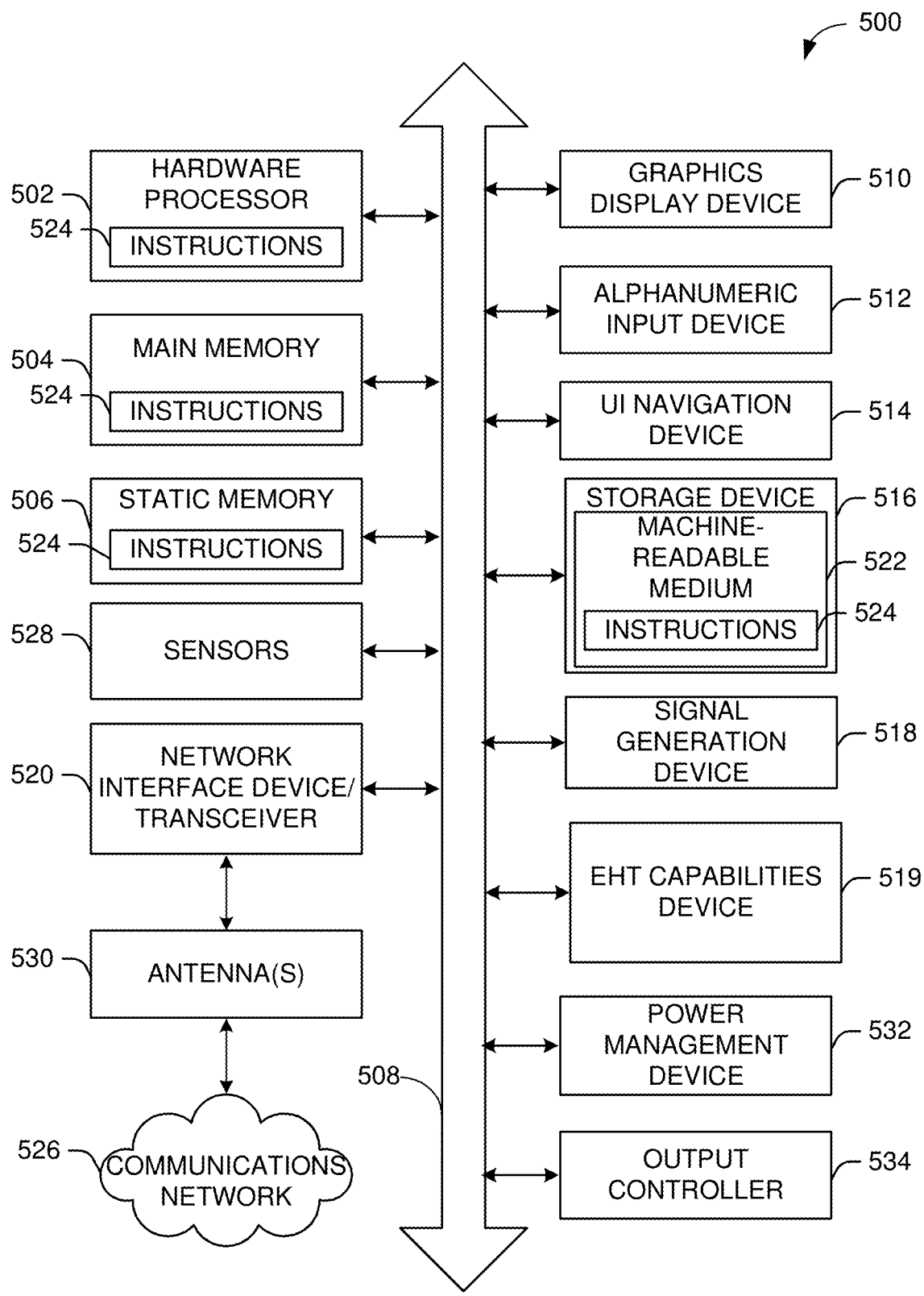
FIG. 5 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 4 and/or the example machine/system of FIG. 5.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QOS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax, 802.11be, etc.), 6 GHz channels (e.g., 802.11ax, 802.11be, etc.), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate EHT capabilities 142 with one or more user devices 120.

ETSI BRAN has recently adopted 2 documents that regulate unlicensed operations at 5 and 6 GHz. It is the result of a compromise between companies that are more Wi-Fi-centric, which were looking to preserve the energy detection (ED) levels that have been used successfully over the last 20 years, and companies that are more cellular-centric, which were looking for the same ED levels for all devices, regardless of other technology-specific protection. This includes the packet detection used in Wi-Fi where the preamble is used to detect if a signal is a Wi-Fi signal.

The compromise results with the following rules for 6 GHz: the ED threshold (EDT) is proportional to the equipment's maximum configured transmit power ($P_{max}$):

For $P_{max} \leq 14$ dBm: EDT=−75 dBm/MHz.

For 14 dBm<$P_{max}$≤24 dBm:EDT=−85 dBm/MHz+(24 dBm−$P_{max}$)     (1).

For $P_{max} \geq 24$ dBm: EDT=−85 dBm/MHz.

The compromise results with the following rules for 5 GHz:

Category 1: for a device operating only in conformance to IEEE 802.11ax, independent of the device's maximum transmit power ($P_H$), the EDT shall be:

EDT=−75 dBm/MHz     (2).

Category 2: Else, the EDT shall be proportional to the device's maximum transmit power ($P_H$):

For $P_H \leq 13$ dBm: EDT=−75 dBm/MHz.

For 13 dBm<$P_H$<23 dBm: EDT=−85 dBm/MHz+(23 dBm−$P_H$)     (3).

For $P_H \geq 23$ dBm: EDT=−85 dBm/MHz.

A device capable of operating in either category, when changing operation from category 2 to category 1, shall not increase the EDT for a period of at least 60 seconds.

At 6 GHz, all devices will have to comply with the ED threshold that varies between −62 dBm per 20 MHz and −72 dBm per 20 MHz depending on the device Max TxPower for 20 MHz.

At 5 GHz, devices that support 802.11 PHY operation including all releases up to the recently deployed 802.11ax are allowed to have an ED threshold of −62 dBm for 20 MHz, while new devices (for instance device compliant with 802.11be) need to respect the threshold that varies between −72 dBm/20 MHz and −62 dBm/20 MHz depending on the device's TxPower. It should be understood that −75 dBm/MHz is equal to −62 dBm per 20 MHz and −85 dBm/MHz is equal to −72 dBm per 20 MHz.

There are debates if this will severally impact 802.11be performance compared to existing 802.11ax (and previous legacy releases) deployments at 5 GHz, but very likely, there will be scenarios where this results in a substantial impact and several scenarios where this will have negligible impact.

It is however interesting to try and find a solution in order to minimize the impact of this change to 802.11be devices.

In one or more embodiments, an EHT capabilities system may facilitate to fully decorrelate multi-link operation, which is a functionality of a multi-link device that has multiple STAs, each operating on a different band, from EHT operation, which is a mode of operation for a particular STA. In that sense, the term device used in ETSI BRAN only refers to the STA that is operating on the band of interest (5 GHz for 5 GHz regulation document, 6 GHz for 6 GHz regulation document), and the term MLD refers to a bigger device that incorporates multiple ETSI-defined devices.

In one or more embodiments, an EHT capabilities system may enable an EHT AP to dynamically enable and disable EHT operation on its BSS, by advertising this change to its associated STAs in a broadcast and/or unicast manner.

This can be achieved by simply removing the EHT capabilities and EHT operation elements from the beacon frames and probe response frames that the AP transmits. This will trigger a critical update change for associated STAs (Critical update flag will be set to 1 and the BSS Parameters Count will be incremented by one) and associated STAs will have to update the BSS parameters of the AP. Therefore, the EHT capabilities and EHT operation elements, will not be transmitted, and therefore this results in the non-support by the AP of EHT modulations and procedures. Following this, the associated STAs shall not transmit EHT PPDUs to their associated APs as this AP thus no longer supports EHT operation. Similarly, to re-enable EHT operation, the AP will restart including EHT capabilities and EHT operation elements in its beacons/probe response frames, triggering another critical update and enabling again EHT operation.

This can also be achieved by defining a new field in the A-control operating mode (OM), or in a frame, in order to allow the AP to disable or enable EHT operation dynamically.

Optionally, an EHT capabilities system may facilitate defining the capability for a device to dynamically enable/disable EHT support.

In one or more embodiments, an EHT capabilities system may dynamically change the ED threshold that the AP and associated STAs will use if EHT is enabled or disabled, so that it is compliant with the ED threshold defined for EHT if EHT support is enabled, and compliant with the ED threshold defined for legacy/11ax if EHT support is disabled.

As the multi-link operation is decorrelated from the different STAs support for EHT operation, within a multi-link device operating on 2.4, 5, and 6 GHz for instance, the STA/AP operating at 5 GHz can enable/disable EHT operation, while not changing anything to multi-link operation of the MLD to which the STA/AP is affiliated with.

In addition, there may be a situation where an 11be AP has 11ax (or legacy standards) associated STAs and 11be associated STAs. If that is the case, 11ax STAs will get strong advantage over 11be STAs because of the ED threshold difference.

For many such devices on the field today, it is difficult to define something new. But for new 11ax devices, it is proposed that new signaling that the AP can include in its Beacon, Probe Response, Association Response frames with a field that determines the ED threshold to be used by 11ax devices (can be between −62 dBm and −72 dBm per 20 MHz).

All STAs that support that functionality (which may be mandatory for all new 11ax devices), would set their ED threshold to the value provided by the AP in the most recently received beacon/probe response/association response frames.

An AP could also enforce a maximum transmit power for its associated STAs, so that all these STAs would operate in the region where the ED threshold is equal to −62 dBm or as close as possible from −62 dBm. This threshold is currently 13 dBm. That makes this possibly applicable in very dense environments.

It is understood that the above descriptions are for purposes of illustration and are not meant to be limiting.

FIG. 1 depicts an illustrative schematic diagram for EHT capabilities, in accordance with one or more example embodiments of the present disclosure.

If a device wants to be part of a multi-link device (MLD), the device has to support 11be (e.g. has to be an EHT device). An EHT device may support 11be functionalities such as support for 320 MHz, puncturing, parsing and EHT PPDU, 4K QAM, 6 GHz operations, etc.).

For 11be devices, the ED threshold is −85 dBm/MHz (i.e., −72 dBm/20 MHz). However, for 11ax devices, the ED threshold may be −75 dBm/MHz (i.e., −62 dBm/20 MHz). Having a lower ED threshold means that a device may detect a transmission at a lower energy level. In that sense, an 11be device may detect a transmission more frequently than an 11ax device. Based on that, the 11be device would refrain from transmission due to the detected transmission.

Figure 2:
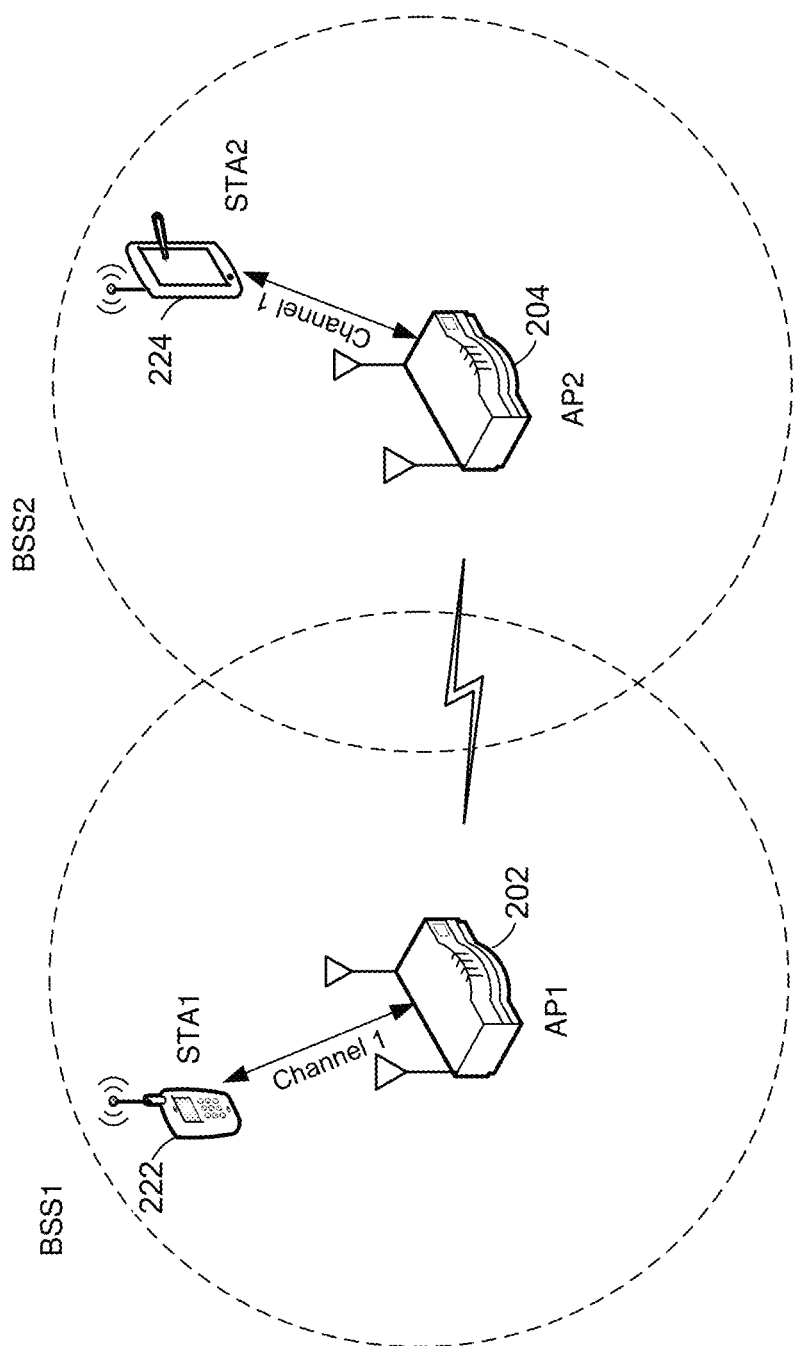
FIG. 2 depicts an illustrative schematic diagram for EHT capabilities system, in accordance with one or more example embodiments of the present disclosure.

Referring to FIG. 2, there is shown two APs (AP1 202 and AP2 204) that may be communicating with their associated STAs (STA1 222 and STA2 224, respectively). In the example of FIG. 2, AP1 202 may be an AP operating as an EHT device (i.e., in accordance with the 802.11be standard) while AP2 may be an AP operating as a legacy device (in accordance with 802.11ax standard or other legacy standards).

The STA1 222 may be an STA operating as an EHT device (i.e., in accordance with the 802.11be standard) while the STA2 224 may be an STA operating as a legacy device (in accordance with 802.11ax standard or other legacy standards).

If the two APs are proximate to each other (e.g., neighboring devices), they may utilize the same frequency medium (e.g., channel 1) when they communicate with their respective STAs.

Typically, devices such as HE devices (in accordance with 802.11ax standard) ignore transmissions from EHT devices. However, EHT devices may not ignore transmissions from HE devices due to the difference between the EHT ED threshold and the HE ED threshold requirements. Therefore, devices operating as HE devices may benefit from that limitation that the EHT devices face due to that difference. Therefore, this results in better performance by the HE devices because the HE device may be able to grab the frequency medium (e.g., channel 1) more frequently than the EHT device.

In the example of FIG. 2, when AP1 202 and AP2 204 may want to utilize channel 1 to communicate with their respective STAs (e.g., STA1 222 and STA2 224, respectively). However, as explained above, since AP2 204 is operating as a legacy device (e.g., in accordance with 802.11ax standard or other legacy standards), it may be able to reserve channel 1 due to the difference in the ED threshold requirements between the two APs.

In one or more embodiments, an EHT capabilities system may facilitate that AP1 202 may de-correlate multi-link operation (MLO) from an EHT device. This way, AP1 202 could support MLO but forgo supporting EHT device functionalities such as support for 320 MHZ, puncturing, parsing and EHT PPDU, 4K QAM, 6 GHz operations, etc. the result is that AP1 202 may have less performance due to foregoing the EHT device functionalities but it will still be able to perform MLO. With this functionality, AP1 202 may be able to mimic an 11ax (or legacy) device in order to allow the ability to use the −62 dBm/20 MHz ED threshold instead of the −72 dBm/20 MHz ED threshold. AP1 202 continues to be able to maintain a subset of 11be functionality (i.e., MLO). Prior to the new regulation that impacts 11be devices, the ED threshold was −62 dBm/20 MHz no matter what the power level is.

In order to classify a device as an 11be or 11ax device, the device will include in its capability an EHT capability element or legacy capability element. In the EHT capability element, the device can set bids to indicate it is capable of the various 11be functionalities/capabilities.

It is understood that the above descriptions are for purposes of illustration and are not meant to be limiting.

Figure 3:
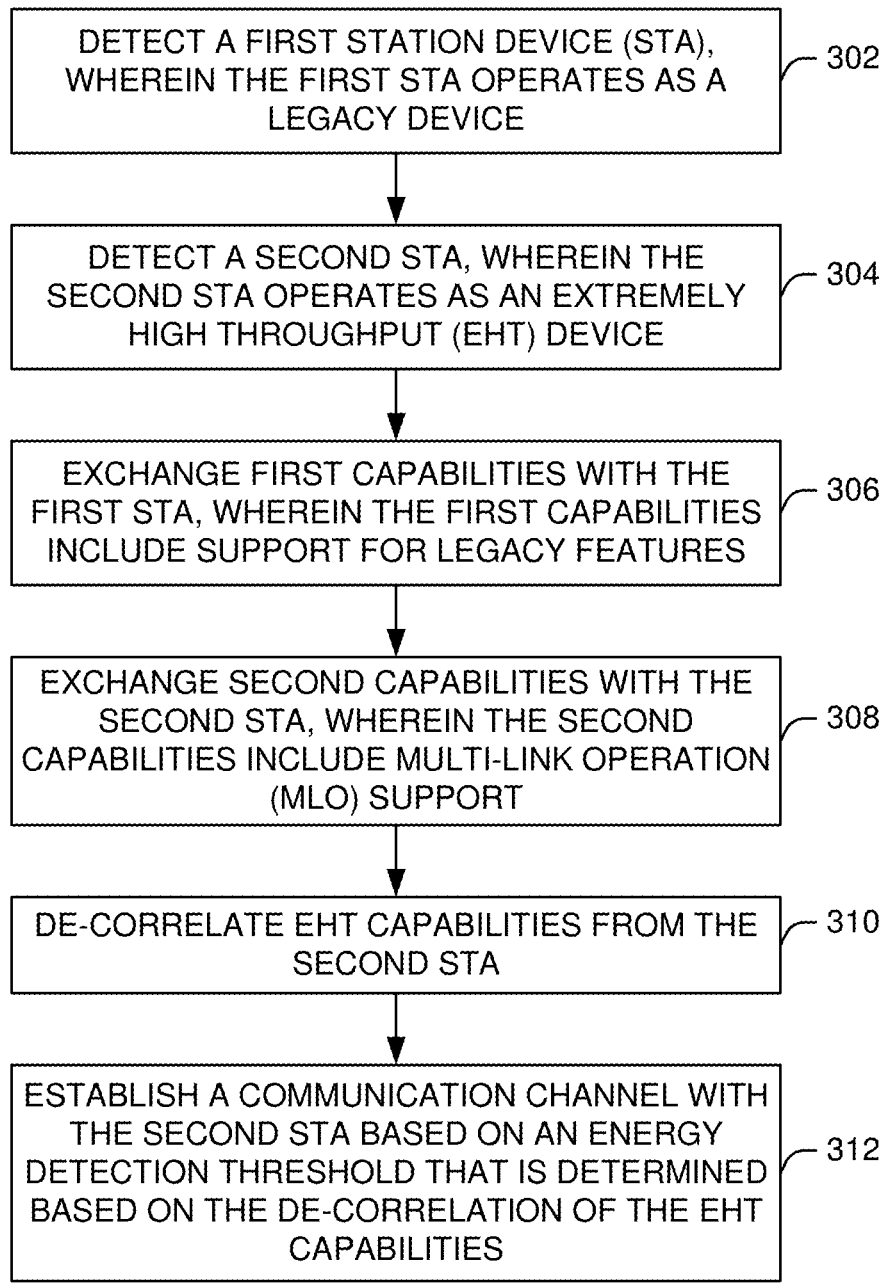
FIG. 3 illustrates a flow diagram of a process for an illustrative EHT capabilities system, in accordance with one or more example embodiments of the present disclosure.

FIG. 3 illustrates a flow diagram of illustrative process 300 for an EHT capabilities system, in accordance with one or more example embodiments of the present disclosure.

At block 302, a device (e.g., the user device(s) 120 and/or the AP 102 of FIG. 1 and/or the EHT capabilities device 519 of FIG. 5) may detect a first station device (STA), wherein the first STA operates as a legacy device.

At block 304, the device may detect a second STA, wherein the second STA operates as an extremely high throughput (EHT) device.

At block 306, the device may exchange first capabilities with the first STA, wherein the first capabilities include support for legacy features.

At block 308, the device may exchange second capabilities with the second STA, wherein the second capabilities include multi-link operation (MLO) support.

At block 310, the device may de-correlate EHT capabilities from the second STA. The device may trigger an update to change the capabilities of the second STA. The update includes a flag that is set to 1 to indicate a de-correlation of the EHT capabilities. The flag indicates to the second STA to update its second capabilities. The second STA may be prohibited from transmitting EHT physical layer protocol data units (PPDUs) to the device due to the de-correlation of the EHT capabilities. The device may transmit one or more beacon frames or probe response frames that do not include EHT capabilities and EHT operation elements.

At block 312, the device may establish a communication channel with the second STA based on an energy detection (ED) threshold that is determined based on the de-correlation of the EHT capabilities. The device may re-enable EHT operation by including EHT capabilities and EHT operation elements in beacon frames or probe response frames.

It is understood that the above descriptions are for purposes of illustration and are not meant to be limiting.

FIG. 4 shows a functional diagram of an exemplary communication station 400, in accordance with one or more example embodiments of the present disclosure. In one embodiment, FIG. 4 illustrates a functional block diagram of a communication station that may be suitable for use as an AP 102 (FIG. 1) or a user device 120 (FIG. 1) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 400 may include one or more processors and may be configured with instructions stored on a computer-readable storage device.

FIG. 5 illustrates a block diagram of an example of a machine 500 or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), an EHT capabilities device 519, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 502 for generation and processing of the baseband signals and for controlling operations of the main memory 504, the storage device 516, and/or the EHT capabilities device 519. The baseband processor may be provided on a single radio card, a single chip, or an integrated circuit (IC).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

The EHT capabilities device 519 may carry out or perform any of the operations and processes (e.g., process 300) described and shown above.

It is understood that the above are only a subset of what the EHT capabilities device 519 may be configured to perform and that other functions included throughout this disclosure may also be performed by the EHT capabilities device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 6:
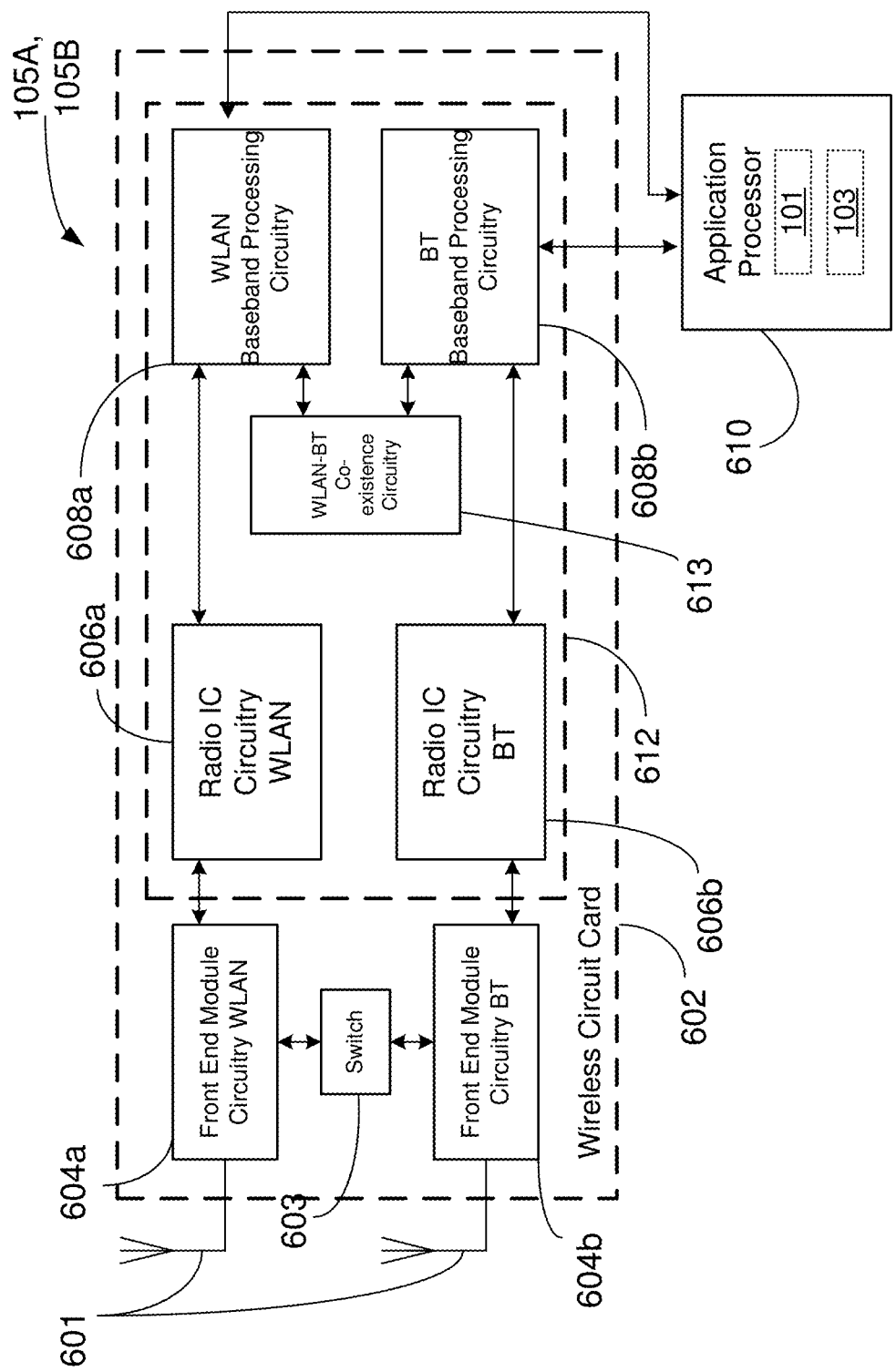
FIG. 6 is a block diagram of a radio architecture in accordance with some examples.

FIG. 6 is a block diagram of a radio architecture 105A, 105B in accordance with some embodiments that may be implemented in any one of the example APs 102 and/or the example STAs 120 of FIG. 1. Radio architecture 105A, 105B may include radio front-end module (FEM) circuitry 604a-b, radio IC circuitry 606a-b and baseband processing circuitry 608a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 604a-b may include a WLAN or Wi-Fi FEM circuitry 604a and a Bluetooth (BT) FEM circuitry 604b. The WLAN FEM circuitry 604a may include a receive signal path comprising circuitry configured to operate on WLAN RF signals received from one or more antennas 601, to amplify the received signals and to provide the amplified versions of the received signals to the WLAN radio IC circuitry 606a for further processing. The BT FEM circuitry 604b may include a receive signal path which may include circuitry configured to operate on BT RF signals received from one or more antennas 601, to amplify the received signals and to provide the amplified versions of the received signals to the BT radio IC circuitry 606b for further processing. FEM circuitry 604a may also include a transmit signal path which may include circuitry configured to amplify WLAN signals provided by the radio IC circuitry 606a for wireless transmission by one or more of the antennas 601. In addition, FEM circuitry 604b may also include a transmit signal path which may include circuitry configured to amplify BT signals provided by the radio IC circuitry 606b for wireless transmission by the one or more antennas. In the embodiment of FIG. 6, although FEM 604a and FEM 604b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 606a-b as shown may include WLAN radio IC circuitry 606a and BT radio IC circuitry 606b. The WLAN radio IC circuitry 606a may include a receive signal path which may include circuitry to down-convert WLAN RF signals received from the FEM circuitry 604a and provide baseband signals to WLAN baseband processing circuitry 608a. BT radio IC circuitry 606b may in turn include a receive signal path which may include circuitry to down-convert BT RF signals received from the FEM circuitry 604b and provide baseband signals to BT baseband processing circuitry 608b. WLAN radio IC circuitry 606a may also include a transmit signal path which may include circuitry to up-convert WLAN baseband signals provided by the WLAN baseband processing circuitry 608a and provide WLAN RF output signals to the FEM circuitry 604a for subsequent wireless transmission by the one or more antennas 601. BT radio IC circuitry 606b may also include a transmit signal path which may include circuitry to up-convert BT baseband signals provided by the BT baseband processing circuitry 608b and provide BT RF output signals to the FEM circuitry 604b for subsequent wireless transmission by the one or more antennas 601. In the embodiment of FIG. 6, although radio IC circuitries 606a and 606b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 608a-b may include a WLAN baseband processing circuitry 608a and a BT baseband processing circuitry 608b. The WLAN baseband processing circuitry 608a may include a memory, such as, for example, a set of RAM arrays in a Fast Fourier Transform or Inverse Fast Fourier Transform block (not shown) of the WLAN baseband processing circuitry 608a. Each of the WLAN baseband circuitry 608a and the BT baseband circuitry 608b may further include one or more processors and control logic to process the signals received from the corresponding WLAN or BT receive signal path of the radio IC circuitry 606a-b, and to also generate corresponding WLAN or BT baseband signals for the transmit signal path of the radio IC circuitry 606a-b. Each of the baseband processing circuitries 608a and 608b may further include physical layer (PHY) and medium access control layer (MAC) circuitry, and may further interface with a device for generation and processing of the baseband signals and for controlling operations of the radio IC circuitry 606a-b.

Referring still to FIG. 6, according to the shown embodiment, WLAN-BT coexistence circuitry 613 may include logic providing an interface between the WLAN baseband circuitry 608a and the BT baseband circuitry 608b to enable use cases requiring WLAN and BT coexistence. In addition, a switch 603 may be provided between the WLAN FEM circuitry 604a and the BT FEM circuitry 604b to allow switching between the WLAN and BT radios according to application needs. In addition, although the antennas 601 are depicted as being respectively connected to the WLAN FEM circuitry 604a and the BT FEM circuitry 604b, embodiments include within their scope the sharing of one or more antennas as between the WLAN and BT FEMs, or the provision of more than one antenna connected to each of FEM 604a or 604b.

In some embodiments, the front-end module circuitry 604a-b, the radio IC circuitry 606a-b, and baseband processing circuitry 608a-b may be provided on a single radio card, such as wireless radio card 602. In some other embodiments, the one or more antennas 601, the FEM circuitry 604a-b and the radio IC circuitry 606a-b may be provided on a single radio card. In some other embodiments, the radio IC circuitry 606a-b and the baseband processing circuitry 608a-b may be provided on a single chip or integrated circuit (IC), such as IC 612.

In some embodiments, the wireless radio card 602 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 608b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHZ, 2.4 GHz, 5 GHZ, and bandwidths of about 2 MHz, 4 MHZ, 5 MHz, 5.5 MHz, 6 MHZ, 8 MHz, 10 MHZ, 20 MHz, 40 MHz, 80 MHZ (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 7:
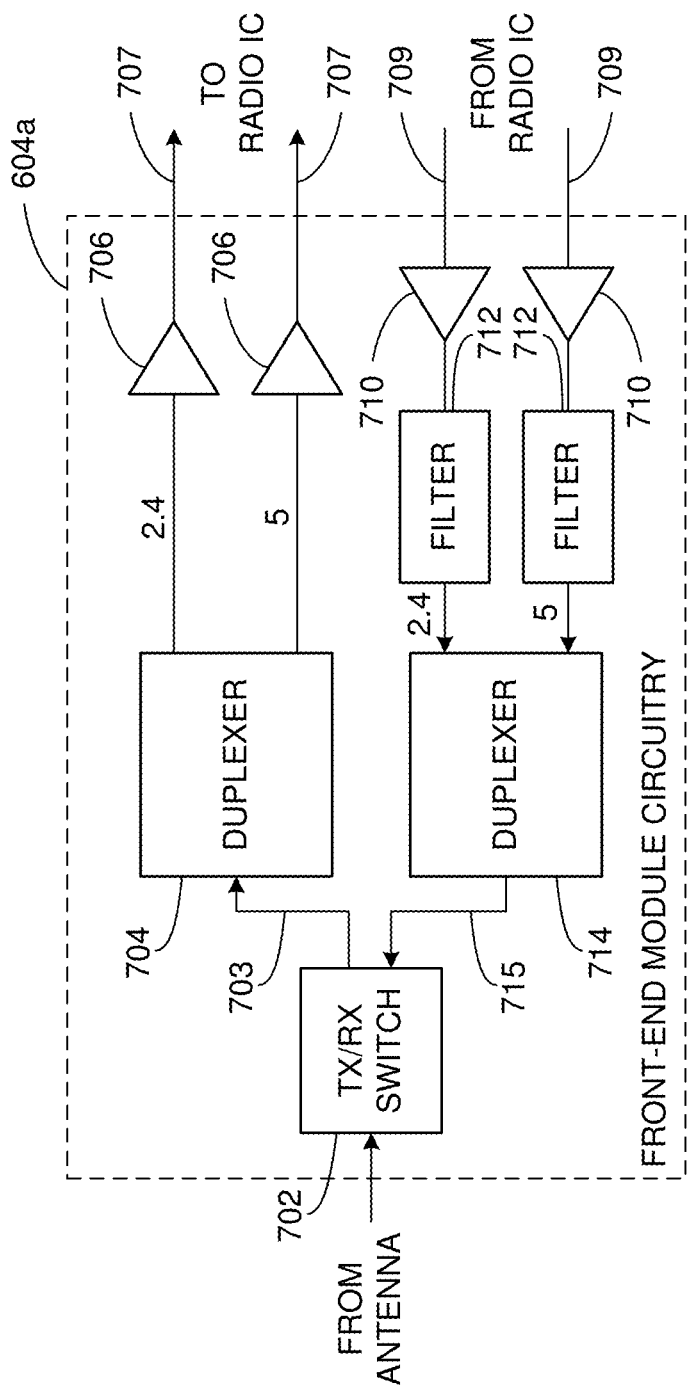
FIG. 7 illustrates an example front-end module circuitry for use in the radio architecture of FIG. 6, in accordance with one or more example embodiments of the present disclosure.

FIG. 7 illustrates WLAN FEM circuitry 604a in accordance with some embodiments. Although the example of FIG. 7 is described in conjunction with the WLAN FEM circuitry 604a, the example of FIG. 7 may be described in conjunction with the example BT FEM circuitry 604b (FIG. 6), although other circuitry configurations may also be suitable.

In some embodiments, the FEM circuitry 604a may include a TX/RX switch 702 to switch between transmit mode and receive mode operation. The FEM circuitry 604a may include a receive signal path and a transmit signal path. The receive signal path of the FEM circuitry 604a may include a low-noise amplifier (LNA) 706 to amplify received RF signals 703 and provide the amplified received RF signals 707 as an output (e.g., to the radio IC circuitry 606a-b (FIG. 6)). The transmit signal path of the circuitry 604a may include a power amplifier (PA) to amplify input RF signals 709 (e.g., provided by the radio IC circuitry 606a-b), and one or more filters 712, such as band-pass filters (BPFs), low-pass filters (LPFs) or other types of filters, to generate RF signals 715 for subsequent transmission (e.g., by one or more of the antennas 601 (FIG. 6)) via an example duplexer 714.

In some dual-mode embodiments for Wi-Fi communication, the FEM circuitry 604a may be configured to operate in either the 2.4 GHz frequency spectrum or the 5 GHz frequency spectrum. In these embodiments, the receive signal path of the FEM circuitry 604a may include a receive signal path duplexer 704 to separate the signals from each spectrum as well as provide a separate LNA 706 for each spectrum as shown. In these embodiments, the transmit signal path of the FEM circuitry 604a may also include a power amplifier 710 and a filter 712, such as a BPF, an LPF or another type of filter for each frequency spectrum and a transmit signal path duplexer 704 to provide the signals of one of the different spectrums onto a single transmit path for subsequent transmission by the one or more of the antennas 601 (FIG. 6). In some embodiments, BT communications may utilize the 2.4 GHz signal paths and may utilize the same FEM circuitry 604a as the one used for WLAN communications.

Figure 8:
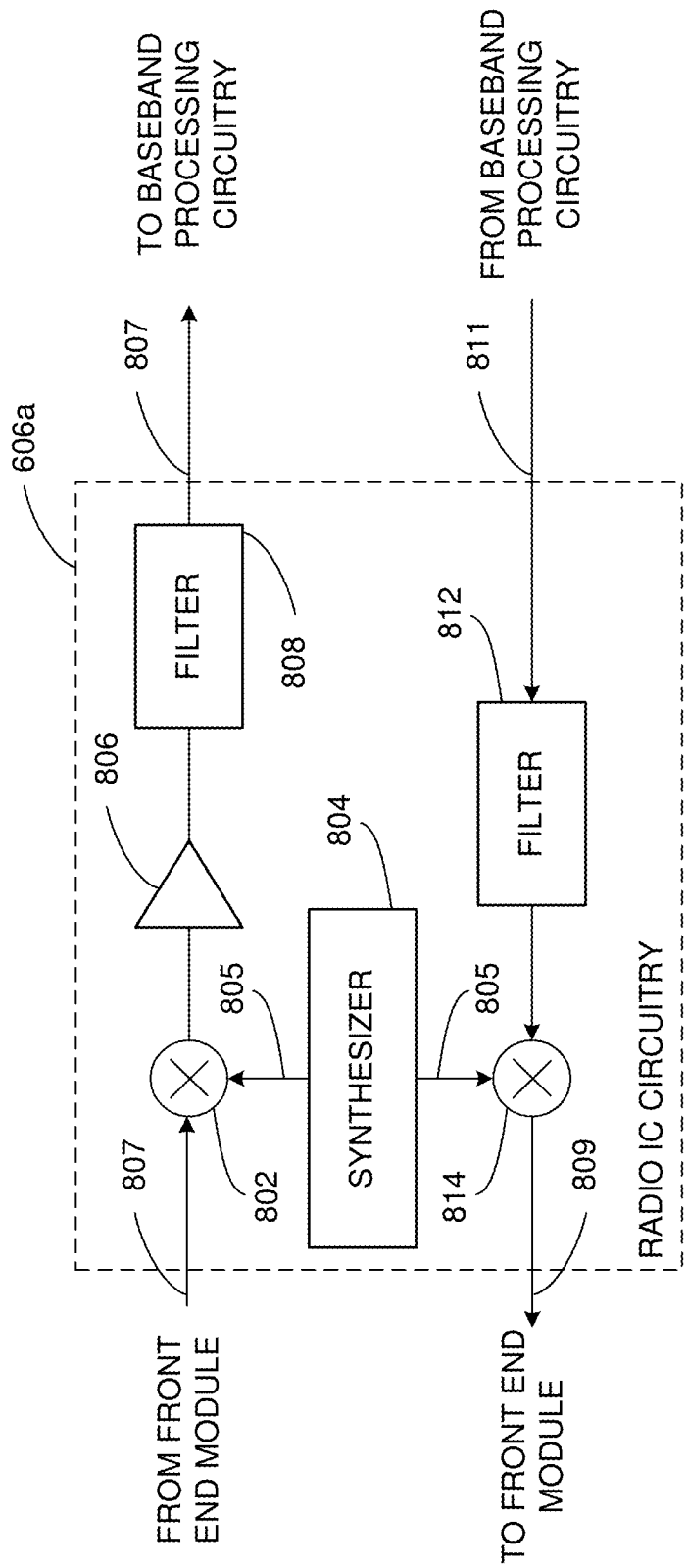
FIG. 8 illustrates an example radio IC circuitry for use in the radio architecture of FIG. 6, in accordance with one or more example embodiments of the present disclosure.

FIG. 8 illustrates radio IC circuitry 606a in accordance with some embodiments. The radio IC circuitry 606a is one example of circuitry that may be suitable for use as the WLAN or BT radio IC circuitry 606a/606b (FIG. 6), although other circuitry configurations may also be suitable. Alternatively, the example of FIG. 8 may be described in conjunction with the example BT radio IC circuitry 606b.

In some embodiments, the radio IC circuitry 606a may include a receive signal path and a transmit signal path. The receive signal path of the radio IC circuitry 606a may include at least mixer circuitry 802, such as, for example, down-conversion mixer circuitry, amplifier circuitry 806 and filter circuitry 808. The transmit signal path of the radio IC circuitry 606a may include at least filter circuitry 812 and mixer circuitry 814, such as, for example, up-conversion mixer circuitry. Radio IC circuitry 606a may also include synthesizer circuitry 804 for synthesizing a frequency 805 for use by the mixer circuitry 802 and the mixer circuitry 814. The mixer circuitry 802 and/or 814 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 8 illustrates only a simplified version of a radio IC circuitry, and may include, although not shown, embodiments where each of the depicted circuitries may include more than one component. For instance, mixer circuitry 814 may each include one or more mixers, and filter circuitries 808 and/or 812 may each include one or more filters, such as one or more BPFs and/or LPFs according to application needs. For example, when mixer circuitries are of the direct-conversion type, they may each include two or more mixers.

In some embodiments, mixer circuitry 802 may be configured to down-convert RF signals 707 received from the FEM circuitry 604a-b (FIG. 6) based on the synthesized frequency 805 provided by synthesizer circuitry 804. The amplifier circuitry 806 may be configured to amplify the down-converted signals and the filter circuitry 808 may include an LPF configured to remove unwanted signals from the down-converted signals to generate output baseband signals 807. Output baseband signals 807 may be provided to the baseband processing circuitry 608a-b (FIG. 6) for further processing. In some embodiments, the output baseband signals 807 may be zero-frequency baseband signals, although this is not a requirement. In some embodiments, mixer circuitry 802 may comprise passive mixers, although the scope of the embodiments is not limited in this respect.

In some embodiments, the mixer circuitry 814 may be configured to up-convert input baseband signals 811 based on the synthesized frequency 805 provided by the synthesizer circuitry 804 to generate RF output signals 709 for the FEM circuitry 604a-b. The baseband signals 811 may be provided by the baseband processing circuitry 608a-b and may be filtered by filter circuitry 812. The filter circuitry 812 may include an LPF or a BPF, although the scope of the embodiments is not limited in this respect.

In some embodiments, the mixer circuitry 802 and the mixer circuitry 814 may each include two or more mixers and may be arranged for quadrature down-conversion and/or up-conversion respectively with the help of synthesizer circuitry 804. In some embodiments, the mixer circuitry 802 and the mixer circuitry 814 may each include two or more mixers each configured for image rejection (e.g., Hartley image rejection). In some embodiments, the mixer circuitry 802 and the mixer circuitry 814 may be arranged for direct down-conversion and/or direct up-conversion, respectively. In some embodiments, the mixer circuitry 802 and the mixer circuitry 814 may be configured for super-heterodyne operation, although this is not a requirement.

Mixer circuitry 802 may comprise, according to one embodiment: quadrature passive mixers (e.g., for the in-phase (I) and quadrature phase (Q) paths). In such an embodiment, RF input signal 707 from FIG. 8 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 805 of synthesizer circuitry 804 (FIG. 8). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 707 (FIG. 7) may comprise a balanced signal, although the scope of the embodiments is not limited in this respect. The I and Q baseband output signals may be provided to low-noise amplifier, such as amplifier circuitry 806 (FIG. 8) or to filter circuitry 808 (FIG. 8).

In some embodiments, the output baseband signals 807 and the input baseband signals 811 may be analog baseband signals, although the scope of the embodiments is not limited in this respect. In some alternate embodiments, the output baseband signals 807 and the input baseband signals 811 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 804 may be a fractional-N synthesizer or a fractional N/N+1 synthesizer, although the scope of the embodiments is not limited in this respect as other types of frequency synthesizers may be suitable. For example, synthesizer circuitry 804 may be a delta-sigma synthesizer, a frequency multiplier, or a synthesizer comprising a phase-locked loop with a frequency divider. According to some embodiments, the synthesizer circuitry 804 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 804 may be provided by a voltage controlled oscillator (VCO), although that is not a requirement. A divider control input may further be provided by either the baseband processing circuitry 608a-b (FIG. 6) depending on the desired output frequency 805. In some embodiments, a divider control input (e.g., N) may be determined from a look-up table (e.g., within a Wi-Fi card) based on a channel number and a channel center frequency as determined or indicated by the example application processor 610. The application processor 610 may include, or otherwise be connected to, one of the example secure signal converter 101 or the example received signal converter 103 (e.g., depending on which device the example radio architecture is implemented in).

In some embodiments, synthesizer circuitry 804 may be configured to generate a carrier frequency as the output frequency 805, while in other embodiments, the output frequency 805 may be a fraction of the carrier frequency (e.g., one-half the carrier frequency, one-third the carrier frequency). In some embodiments, the output frequency 805 may be a LO frequency (fLO).

Figure 9:
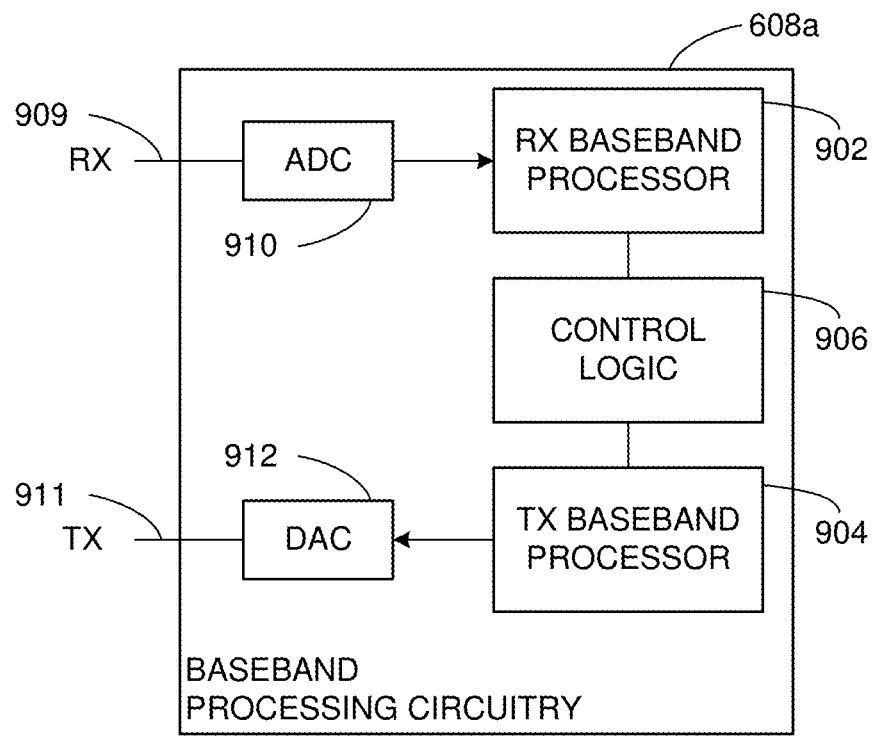
FIG. 9 illustrates an example baseband processing circuitry for use in the radio architecture of FIG. 6, in accordance with one or more example embodiments of the present disclosure.

FIG. 9 illustrates a functional block diagram of baseband processing circuitry 608a in accordance with some embodiments. The baseband processing circuitry 608a is one example of circuitry that may be suitable for use as the baseband processing circuitry 608a (FIG. 6), although other circuitry configurations may also be suitable. Alternatively, the example of FIG. 8 may be used to implement the example BT baseband processing circuitry 608b of FIG. 6.

The baseband processing circuitry 608a may include a receive baseband processor (RX BBP) 902 for processing receive baseband signals 809 provided by the radio IC circuitry 606a-b (FIG. 6) and a transmit baseband processor (TX BBP) 904 for generating transmit baseband signals 811 for the radio IC circuitry 606a-b. The baseband processing circuitry 608a may also include control logic 906 for coordinating the operations of the baseband processing circuitry 608a.

In some embodiments (e.g., when analog baseband signals are exchanged between the baseband processing circuitry 608a-b and the radio IC circuitry 606a-b), the baseband processing circuitry 608a may include ADC 910 to convert analog baseband signals 909 received from the radio IC circuitry 606a-b to digital baseband signals for processing by the RX BBP 902. In these embodiments, the baseband processing circuitry 608a may also include DAC 912 to convert digital baseband signals from the TX BBP 904 to analog baseband signals 911.

In some embodiments that communicate OFDM signals or OFDMA signals, such as through baseband processor 608a, the transmit baseband processor 904 may be configured to generate OFDM or OFDMA signals as appropriate for transmission by performing an inverse fast Fourier transform (IFFT). The receive baseband processor 902 may be configured to process received OFDM signals or OFDMA signals by performing an FFT. In some embodiments, the receive baseband processor 902 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 6, in some embodiments, the antennas 601 (FIG. 6) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 601 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: detect a first station device (STA), wherein the first STA operates as a legacy device; detect a second STA, wherein the second STA operates as an extremely high throughput (EHT) device; exchange first capabilities with the first STA, wherein the first capabilities include support for legacy features; exchange second capabilities with the second STA, wherein the second capabilities include multi-link operation (MLO) support; dynamically de-correlate EHT capabilities from the second STA; and establish a communication channel with the second STA based on an ED threshold that may be determined based on the de-correlation of the EHT capabilities.

Example 2 may include the device of example 1 and/or some other example herein, wherein the processing circuitry may be further configured to trigger an update to change the capabilities of the second STA.

Example 3 may include the device of example 2 and/or some other example herein, wherein the update may include a flag that may be set to 1 to indicate a de-correlation of the EHT capabilities.

Example 4 may include the device of example 3 and/or some other example herein, wherein the flag indicates to the second STA to update its second capabilities.

Example 5 may include the device of example 1 and/or some other example herein, wherein the second STA may be prohibited from transmitting EHT physical layer protocol data units (PPDUs) to the device due to the de-correlation of the EHT capabilities.

Example 6 may include the device of example 1 and/or some other example herein, wherein the processing circuitry may be further configured to transmit one or more beacon frames or probe response frames that do not include EHT capabilities and EHT operation elements.

Example 7 may include the device of example 1 and/or some other example herein, wherein the processing circuitry may be further configured to re-enable EHT operation by including EHT capabilities and EHT operation elements in beacon frames or probe response frames.

Example 8 may include the device of example 1 and/or some other example herein, further comprising a transceiver configured to transmit and receive wireless signals.

Example 9 may include the device of example 8 and/or some other example herein, further comprising an antenna coupled to the transceiver.

Example 10 may include a non-transitory computer-readable medium storing computer-executable instructions which when executed by one or more processors result in performing operations comprising: detecting a first station device (STA), wherein the first STA operates as a legacy device; detecting a second STA, wherein the second STA operates as an extremely high throughput (EHT) device; exchanging first capabilities with the first STA, wherein the first capabilities include support for legacy features; exchanging second capabilities with the second STA, wherein the second capabilities include multi-link operation (MLO) support; dynamically de-correlating EHT capabilities from the second STA; and establishing a communication channel with the second STA based on an ED threshold that may be determined based on the de-correlation of the EHT capabilities.

Example 11 may include the non-transitory computer-readable medium of example 10 and/or some other example herein, wherein the operations further comprise trigger an update to change the capabilities of the second STA.

Example 12 may include the non-transitory computer-readable medium of example 11 and/or some other example herein, wherein the update may include a flag that may be set to 1 to indicate a de-correlation of the EHT capabilities.

Example 13 may include the non-transitory computer-readable medium of example 12 and/or some other example herein, wherein the flag indicates to the second STA to update its second capabilities.

Example 14 may include the non-transitory computer-readable medium of example 10 and/or some other example herein, wherein the second STA may be prohibited from transmitting EHT physical layer protocol data units (PPDUs) to the device due to the de-correlation of the EHT capabilities.

Example 15 may include the non-transitory computer-readable medium of example 10 and/or some other example herein, wherein the operations further comprise transmitting one or more beacon frames or probe response frames that do not include EHT capabilities and EHT operation elements.

Example 16 may include the non-transitory computer-readable medium of example 10 and/or some other example herein, wherein the operations further comprise re-enable EHT operation by including EHT capabilities and EHT operation elements in beacon frames or probe response frames.

Example 17 may include a method comprising: detecting, by one or more processors, a first station device (STA), wherein the first STA operates as a legacy device; detecting a second STA, wherein the second STA operates as an extremely high throughput (EHT) device; exchanging first capabilities with the first STA, wherein the first capabilities include support for legacy features; exchanging second capabilities with the second STA, wherein the second capabilities include multi-link operation (MLO) support; dynamically de-correlating EHT capabilities from the second STA; and establishing a communication channel with the second STA based on an ED threshold that may be determined based on the de-correlation of the EHT capabilities.

Example 18 may include the method of example 17 and/or some other example herein, further comprising trigger an update to change the capabilities of the second STA.

Example 19 may include the method of example 18 and/or some other example herein, wherein the update may include a flag that may be set to 1 to indicate a de-correlation of the EHT capabilities.

Example 20 may include the method of example 19 and/or some other example herein, wherein the flag indicates to the second STA to update its second capabilities.

Example 21 may include the method of example 17 and/or some other example herein, wherein the second STA may be prohibited from transmitting EHT physical layer protocol data units (PPDUs) to the device due to the de-correlation of the EHT capabilities.

Example 22 may include the method of example 17 and/or some other example herein, further comprising transmitting one or more beacon frames or probe response frames that do not include EHT capabilities and EHT operation elements.

Example 23 may include the method of example 17 and/or some other example herein, further comprising re-enable EHT operation by including EHT capabilities and EHT operation elements in beacon frames or probe response frames.

Example 24 may include an apparatus comprising means for: detecting a first station device (STA), wherein the first STA operates as a legacy device; detecting a second STA, wherein the second STA operates as an extremely high throughput (EHT) device; exchanging first capabilities with the first STA, wherein the first capabilities include support for legacy features; exchanging second capabilities with the second STA, wherein the second capabilities include multi-link operation (MLO) support; dynamically de-correlating EHT capabilities from the second STA; and establishing a communication channel with the second STA based on an ED threshold that may be determined based on the de-correlation of the EHT capabilities.

Example 25 may include the apparatus of example 24 and/or some other example herein, further comprising trigger an update to change the capabilities of the second STA.

Example 26 may include the apparatus of example 25 and/or some other example herein, wherein the update may include a flag that may be set to 1 to indicate a de-correlation of the EHT capabilities.

Example 27 may include the apparatus of example 26 and/or some other example herein, wherein the flag indicates to the second STA to update its second capabilities.

Example 28 may include the apparatus of example 24 and/or some other example herein, wherein the second STA may be prohibited from transmitting EHT physical layer protocol data units (PPDUs) to the device due to the de-correlation of the EHT capabilities.

Example 29 may include the apparatus of example 24 and/or some other example herein, further comprising transmitting one or more beacon frames or probe response frames that do not include EHT capabilities and EHT operation elements.

Example 30 may include the apparatus of example 24 and/or some other example herein, further comprising re-enable EHT operation by including EHT capabilities and EHT operation elements in beacon frames or probe response frames.

Example 31 may include one or more non-transitory computer-readable media comprising instructions to cause an electronic device, upon execution of the instructions by one or more processors of the electronic device, to perform one or more elements of a method described in or related to any of examples 1-30, or any other method or process described herein.

Example 32 may include an apparatus comprising logic, modules, and/or circuitry to perform one or more elements of a method described in or related to any of examples 1-30, or any other method or process described herein.

Example 33 may include a method, technique, or process as described in or related to any of examples 1-30, or portions or parts thereof.

Example 34 may include an apparatus comprising: one or more processors and one or more computer readable media comprising instructions that, when executed by the one or more processors, cause the one or more processors to perform the method, techniques, or process as described in or related to any of examples 1-30, or portions thereof.

Example 35 may include a method of communicating in a wireless network as shown and described herein.

Example 36 may include a system for providing wireless communication as shown and described herein.

Example 37 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   detect a first station device (STA), wherein the first STA operates as a legacy device;
   detect a second STA, wherein the second STA operates as an extremely high throughput (EHT) device;
   exchange first capabilities with the first STA, wherein the first capabilities include support for legacy features;
   exchange second capabilities with the second STA, wherein the second capabilities include multi-link operation (MLO) support;
   de-correlate EHT capabilities from the second STA; and
   establish a communication channel with the second STA based on an energy detection (ED) threshold that is determined based on the de-correlation of the EHT capabilities.

2. The device of claim 1, wherein the processing circuitry is further configured to trigger an update to change the capabilities of the second STA.

3. The device of claim 2, wherein the update includes a flag that is set to 1 to indicate a de-correlation of the EHT capabilities.

4. The device of claim 3, wherein the flag indicates to the second STA to update its second capabilities.

5. The device of claim 1, wherein the second STA is prohibited from transmitting EHT physical layer protocol data units (PPDUs) to the device due to the de-correlation of the EHT capabilities.

6. The device of claim 1, wherein the processing circuitry is further configured to transmit one or more beacon frames or probe response frames that do not include EHT capabilities and EHT operation elements.

7. The device of claim 1, wherein the processing circuitry is further configured to re-enable EHT operation by including EHT capabilities and EHT operation elements in beacon frames or probe response frames.

8. The device of claim 1, further comprising a transceiver configured to transmit and receive wireless signals.

9. The device of claim 8, further comprising an antenna coupled to the transceiver.

10. A non-transitory computer-readable medium storing computer-executable instructions which when executed by one or more processors result in performing operations comprising:
- detecting a first station device (STA), wherein the first STA operates as a legacy device;
- detecting a second STA, wherein the second STA operates as an extremely high throughput (EHT) device;
- exchanging first capabilities with the first STA, wherein the first capabilities include support for legacy features;
- exchanging second capabilities with the second STA, wherein the second capabilities include multi-link operation (MLO) support;
- de-correlating EHT capabilities from the second STA; and
- establishing a communication channel with the second STA based on an energy detection (ED) threshold that is determined based on the de-correlation of the EHT capabilities.

11. The non-transitory computer-readable medium of claim 10, wherein the operations further comprise trigger an update to change the capabilities of the second STA.

12. The non-transitory computer-readable medium of claim 11, wherein the update includes a flag that is set to 1 to indicate a de-correlation of the EHT capabilities.

13. The non-transitory computer-readable medium of claim 12, wherein the flag indicates to the second STA to update its second capabilities.

14. The non-transitory computer-readable medium of claim 10, wherein the second STA is prohibited from transmitting EHT physical layer protocol data units (PPDUs) to the device due to the de-correlation of the EHT capabilities.

15. The non-transitory computer-readable medium of claim 10, wherein the operations further comprise transmitting one or more beacon frames or probe response frames that do not include EHT capabilities and EHT operation elements.

16. The non-transitory computer-readable medium of claim 10, wherein the operations further comprise re-enable EHT operation by including EHT capabilities and EHT operation elements in beacon frames or probe response frames.

17. A method comprising:
- detecting, by one or more processors, a first station device (STA), wherein the first STA operates as a legacy device;
- detecting a second STA, wherein the second STA operates as an extremely high throughput (EHT) device;
- exchanging first capabilities with the first STA, wherein the first capabilities include support for legacy features;
- exchanging second capabilities with the second STA, wherein the second capabilities include multi-link operation (MLO) support;
- de-correlating EHT capabilities from the second STA; and
- establishing a communication channel with the second STA based on an energy detection (ED) threshold that is determined based on the de-correlation of the EHT capabilities.

18. The method of claim 17, further comprising trigger an update to change the capabilities of the second STA.

19. The method of claim 18, wherein the update includes a flag that is set to 1 to indicate a de-correlation of the EHT capabilities.

20. The method of claim 19, wherein the flag indicates to the second STA to update its second capabilities.

* * * * *